March 13, 1962  R. E. MADISON  3,024,711
IRON-EPOXY FLOORS AND PROCESS FOR MAKING THEM
Filed Sept. 25, 1958
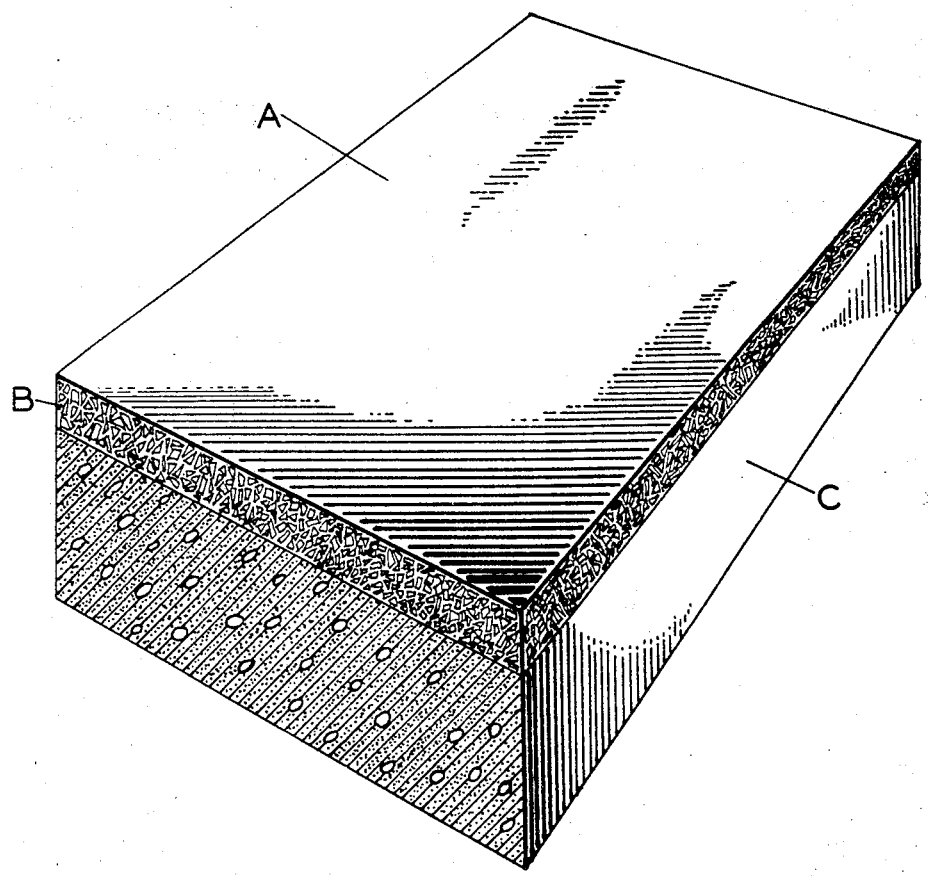
INVENTOR.
RALPH E. MADISON
BY *Norman L. Wilson Jr.*

United States Patent Office 3,024,711
Patented Mar. 13, 1962

3,024,711
IRON-EPOXY FLOORS AND PROCESS FOR
MAKING THEM
Ralph E. Madison, Detroit, Mich., assignor to Devoe &
Raynolds Company, Inc., a corporation of New York
Filed Sept. 25, 1958, Ser. No. 763,205
4 Claims. (Cl. 94—3)

This invention pertains to improvements in the floor surfaces of industrial plants and particularly to the resurfacing, including patching of floors which become pitted, rutted, or cracked as a result of wear, shock load or the action of chemicals.

In chemical plants around reactors, and in factories where floors are constantly subjected to high loading and abrasion, maintenance of floors presents a serious problem. In some automotive plants for instance, trucks carrying parts to and from the production line have steel wheels. Cement floors cannot withstand the production line traffic due to these trucks. In heat treating plants such as metal fabricating plants trucks do not have rubber tires because of the high heat. These floors require almost constant repair.

This invention pertains to the production of extremely tough long-wearing floor surfaces where high loading and abrasion are involved. Through the use of this invention floor surfaces are provided in those parts of industrial plants in which concrete cannot withstand the wear and tear to which the floor is subjected. The floor surfaces provided herein withstand shock and resist heat, chemicals, abrasion and other causes of deterioration so that constant resurfacing, or patching, of the floors is rendered unnecessary. In accordance with this invention there is provided a process for resurfacing floors in industrial plants which embodies coating the floor surface with a composition comprising a viscous mixture of an ethoxyline resin and cast-iron particles. By a viscous mixture is meant a mixture of an ethoxyline resin, or mixture of ethoxyline resins, and particulate iron which can be troweled or spread over an already existing compatible base such as a concrete floor, so that after the resin has set, there is formed a solid mass or sheet of iron particles embedded in a tough resin with the whole being in intimate contact and firmly bonded to the base surface. Steel and aluminum powder filled ethoxyline resins are used as solder sticks, but the problem of wear and tear of industrial plant floors has remained unsolved.

The invention can perhaps more clearly be illustrated by reference to the drawing, consisting of a single FIGURE.

The FIGURE in the drawing is a view in perspective showing how a block of the concrete floor would appear if cut away.

In the FIGURE, A is the compressed smooth plane top surface having the physical properties of a continuous sheet of iron. At B is shown this cured floor surface comprising an ethoxyline resin admixed with a major amount by weight of iron particles. C is the concrete supporting base having surface B bonded thereto.

In the preparation of the iron-binder composition for use on floors according to this invention in order to form a viscous mix of the ethoxyline resin and the iron particles, the ethoxyline resin must be in the liquid form. A low molecular weight liquid ethoxyline resin such as the diglycidyl ether of bisphenol is generally used. The term "ethoxyline resin" denotes the well known resins prepared by the condensation of an epihalohydrin with a polyhydric alcohol or phenol with subsequent dehydrohalogenation using a caustic alkali. As well known in the art, ethoxyline resins are made by condensing glycerol dichlorohydrin or epichlorohydrin with ethylene glycol, diethylene glycol, glycerol, diglycerol, catechol, resorcinol, a trihydroxybenzene, a di(hydroxyphenyl)methane, a di(hydroxyphenyl)ethane, a di(hydroxyphenyl)propane, dihydroxydiphenyl sulfone, etc. according to U.S. Patents 2,581,464, 2,582,985, 2,615,007, 2,615,008, 2,698,315, and 2,731,444. By reference the aforementioned patents are intended to be included as a part of the present description of the ethoxyline resins, and for brevity the ethoxyline resin will not be described other than as a polyether having terminal epoxide groups on vicinal carbon atoms. While liquid resins are generally contemplated herein, polymeric higher molecular weight resins described can be used in the thinner films if dissolved in a suitable volatile solvent. Suitable ethoxyline resin solvents are oxygenated solvents such as ketones, esters and ethers for instance methyl isobutyl ketones, acetone, ethyl acetate, butyl acetate and the diethyl ether of ethylene glycol.

This invention is not limited to any special size iron particles or any concentration of iron particles in the binder since the iron particle size and amount will vary with the thickness of the coating and shock or impact to which the coating will be subjected. Iron size is important but it is not the dominant feature of the invention. As a practical matter in most instances the ethoxyline resin binder will be mixed with crushed iron particles from a machine shop such as crushed cast-iron borings, and the like. And a sufficient amount of iron particles is used so that the mixture is of such a consistency that it can be troweled or readily spread. As a rule iron particles employed will be smaller than 1/8 inch in diameter. However, for thick surfaces or layers particles around one-fourth inch in diameter or larger can be used. Generally the particles will pass through a No. 4, U.S. sieve and remain on a No. 100 U.S. sieve. It is possible, of course, that in some cases one will want graded iron particles, that is a particle-size distribution of iron particles for maximum density, but for most purposes it will be unnecessary, and composition will be workable without grading, smaller particles being used for thin layers and larger particles for thick layers.

It is understood that the ethoxyline resin-iron particle mixture will not be used as it is but must contain a curing agent. As in the application of cement, the ethoxyline resin binder containing pigments and the like as desired will be mixed with the iron particles and curing agent just prior to resurfacing or patching. The curing agent can be combined with the binder liquid and the resulting combination can then be mixed with the iron particles to form a composition of suitable consistency. Any of the known ethoxyline resin curing agents can be used depending on desired pot life and desired rate of cure. The most frequently employed curing agents are polyfunctional primary and secondary amines such as ethylene diamine, diethylene triamines, tetraethylene pentamine, and diethyl amine. However, organic acids, amine salts, amides and $BF_3$ complexes can also be used, for example phthalic acid or anhydride, dicyandiamide, and $BF_3$ monoethylamine.

As an illustration of a method of producing tough long wearing floor surfaces according to the invention a thermosetting resin is made by combining 77.5 parts by weight of a glycidyl ether of bisphenol having a weight per epoxide of 190, 77.5 parts of chlorinated diphenyl as an extender and 15.5 parts of tetraethylene pentamine as a catalyst. To the above resin composition is added 835 parts by weight of crushed iron borings having, in this instance, the following sieve analysis: 0 to 10 percent return on No. 8 sieve, 15 to 30 percent return on No. 16 sieve, 50 to 65 percent return on No. 30 sieve, 90 to 95 percent return on No. 50 sieve, 95 to 100 percent return on No. 100 sieve, and 0 to 10 percent passing on No. 100 sieve. The combination is thoroughly mixed to produce a uniform distribution of resin and iron. The composition is then troweled and worked onto a flat slab of concrete previously prepared by wire brushing to remove powder and loose particles, forming in this instance a layer approximately ¼ inch thick. After approximately 18 hours, the resin had set and the mass was firm and hard. The physical qualities were then tested by striking the surface with a hammer, and it was demonstrated that the surfacing had outstanding toughness and adhesion. Extenders other than chlorinated diphenyls, such as dibutyl phthalate, or polyesters based on long chain polybasic acids esterified with polyhydric alcohols like glycerol, such as Paraplex G-60, can be used. However, chlorinated diphenyls in addition to being extenders have been found to increase the pot life.

The amount of iron employed will, as indicated, depend upon the desired properties. However, if too little iron is used, the surface will be unsatisfactory because of shrinkage. In fact because of the shrinkage factor 100 percent solids ethoxyline resins are not frequently employed as floor coatings. Hence a major amount of the surfacing composition of this invention is particulate iron, such as white cast iron, gray cast iron or wrought iron. The floor surface should have the appearance of a metallic floor and not a speckled resin surface. Hence the surfacing composition usually is 85 percent iron, preferably 90 percent iron and 10 percent resin (including catalyst). In fact it is possible to use as much as 93 percent iron by spreading the resin on the floor and tamping in the iron. But all of the iron particles will not be completely coated. A thin film of resin around each iron particle is desirable for the best properties.

As the foregoing illustrates, by means of this composition, a floor surface is provided which will be tougher and more resistant to shock load than the usual concrete floor, first because iron is less brittle than the usual concrete aggregate, and second because the resin binder employed is less brittle and has greater tensile properties than Portland cement which is the binder used in ordinary concrete floors.

It is understood that this invention is concerned with room temperature (25° C. to 30° C.) curing, from 0.1 to 10 percent of a known ethoxyline curing agent being used. In addition the surfacing composition of this invention need not be devoid of other materials. Thus pigments, fillers, or extenders and the like can all be used. Other variations and modifications will also occur to those skilled in the art, and such ramifications are considered within the scope of this invention.

What is claimed is:

1. A method for providing a re-surfaced low friction concrete floor having a wear surface resistant to high loading and abrasion which comprises mixing an ethoxyline resin in liquid form with an ethoxyline resin curing agent, applying the resin and curing agent before the resin has cured, together with iron in the form of particles of .01 inch to .25 inch diameter, to the concrete surface, said iron particles being of the group consisting of wrought iron and cast iron particles, said iron particles comprising the major amount by weight of the composition, sufficient on densification to form substantially a continuous surface, densifying the iron particles by troweling or tamping to form a smooth, plane surface having the physical properties of a continuous sheet of iron and allowing the densified surface to cure on said floor after densification.

2. The method of claim 1 wherein the ethoxyline resin is a liquid glycidyl polyether of bisphenol having a weight per epoxide below 210.

3. The method of claim 1 wherein the ethoxyline resin has a weight per epoxide above 210 and is dissolved in an oxygenated solvent.

4. A floor comprising a concrete supporting base and a low friction, exposed wear surface, resistant to high loading and abrasion bonded thereto, said wear surface comprising (1) a resinous composition which includes an ethoxyline resin admixed with a curing agent therefor, and (2) iron in the form of particles of .01 inch to .25 inch diameter, said particles being bonded by said composition with some of said particles being exposed at the surface of said composition, said iron particles being of the group consisting of wrought iron and cast iron particles, said iron particles comprising 85 to 93 percent by weight of the resinous composition, the particles being densified to form a smooth, plane surface having the physical properties of a continuous sheet of iron, said resinous composition bonding said particles to said supporting base.

References Cited in the file of this patent

UNITED STATES PATENTS

| | | |
|---|---|---|
| 2,705,223 | Renfrew | Mar. 29, 1955 |
| 2,707,177 | Skiff | Apr. 26, 1955 |
| 2,718,829 | Seymour | Sept. 27, 1955 |
| 2,735,829 | Wiles | Feb. 21, 1956 |
| 2,895,389 | Nagin | July 21, 1959 |
| 2,906,720 | Simpson | Sept. 29, 1959 |
| 2,925,831 | Welty | Feb. 23, 1960 |

FOREIGN PATENTS

| | | |
|---|---|---|
| 513,453 | Great Britain | Oct. 12, 1939 |

OTHER REFERENCES

Journal of the American Concrete Institute, August 1957, p. 173.

Epoxy Resins by Lee and Neville, pp. 148, 149 and 151, 1957, pub. by McGraw-Hill Co. N.Y.